United States Patent
Magdina et al.

(10) Patent No.: US 10,811,018 B2
(45) Date of Patent: Oct. 20, 2020

(54) SYSTEM AND METHOD FOR USING A UNIDIRECTIONAL WATERMARK FOR INFORMATION LEAK IDENTIFICATION

(71) Applicant: Saudi Arabian Oil Company, Dhahran (SA)

(72) Inventors: Peter Magdina, Al Khobar (SA);
Hussain A AlNasser, Dammam (SA);
Kashif Khawaja, Dhahran (SA);
Abdullah AlMakki, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/209,258

(22) Filed: Dec. 4, 2018

(65) Prior Publication Data
US 2020/0176003 A1    Jun. 4, 2020

(51) Int. Cl.
*G06F 17/00*    (2019.01)
*G10L 19/018*   (2013.01)
*H04M 7/00*     (2006.01)

(52) U.S. Cl.
CPC ......... *G10L 19/018* (2013.01); *H04M 7/0078* (2013.01)

(58) Field of Classification Search
CPC ............................ G10L 19/018; H04M 7/0078
See application file for complete search history.

(56) References Cited

U.S. PATENT DOCUMENTS

| | | |
|---|---|---|
| 8,121,264 B1 | 2/2012 | Hogg, Jr. et al. |
| 2001/0019618 A1 | 9/2001 | Rhoads |
| 2005/0025126 A1* | 2/2005 | Patfield ............... H04L 12/6418 370/352 |

(Continued)

FOREIGN PATENT DOCUMENTS

| | | | |
|---|---|---|---|
| KR | 20180005470 A | * | 1/2018 |
| KR | 20180005470 A | | 1/2018 |

OTHER PUBLICATIONS

Mazurczyk Wojciech, et al. "New VoIP Traffic Security Scheme with Digital Watermarking" J. Górski (Ed.): SAFECOMP, 2006, pp. 170-181, (2006);.

(Continued)

*Primary Examiner* — Joseph Saunders, Jr.
(74) *Attorney, Agent, or Firm* — Leason Ellis LLP

(57) ABSTRACT

Methods and systems for preventing information leaks in telephony communications involving any number of parties for use in an IP telephony network having core components. A method according to one aspect of the disclosure comprises receiving an outbound audio and signaling stream from a first terminal device within the IP telephony network, determining call parameters of the outbound audio stream, storing the call parameters within the IP telephony network, and inserting a watermark into the outbound audio stream routed from the IP telephony core components to the second terminal device with an audio watermark using the determined call parameters within the IP telephony network, wherein the watermarked outbound audio stream can be used to identify unauthorized recordings of the outbound audio stream recorded at a second terminal device at which the watermarked outbound stream is received.

17 Claims, 7 Drawing Sheets

(56) References Cited

U.S. PATENT DOCUMENTS

| | | | |
|---|---|---|---|
| 2005/0220095 A1* | 10/2005 | Narayanan | H04L 63/126 370/389 |
| 2009/0086631 A1 | 4/2009 | Jayapalan et al. | |
| 2015/0100991 A1* | 4/2015 | Risberg | H04L 67/104 725/80 |
| 2015/0373032 A1* | 12/2015 | Stevens | H04L 63/14 713/176 |

OTHER PUBLICATIONS

Lie, Wen-Nung, and Li-Chun Chang. "Robust and high-quality time-domain audio watermarking based on low-frequency amplitude modification." IEEE transactions on multimedia 8.1 (2006): 46-59.

Bhat, Vivekananda, Indranil Sengupta, and Abhijit Das. "An audio watermarking scheme using singular value decomposition and dither-modulation quantization." Multimedia Tools and Applications 52.2-3 (2011): 369-383.

Mansour, Mohamed F., and Ahmed H. Tewfik. "Audio watermarking by time-scale modification." 2001 IEEE International Conference on Acoustics, Speech, and Signal Processing. Proceedings (Cat. No. 01CH37221). vol. 3. IEEE, 2001.

International Search Report and Written Opinion in corresponding PCT Application No. PCT/US2019/064241 dated Feb. 21, 2020. 33 pages.

* cited by examiner

SYSTEM AND METHOD FOR USING A UNIDIRECTIONAL WATERMARK FOR INFORMATION LEAK IDENTIFICATION

FIELD OF THE INVENTION

The present invention relates to telephony, and, more particularly, relates to a system and method for using a unidirectional watermark for information leak identification.

BACKGROUND OF THE INVENTION

In many organizations, a great deal of confidential information is communicated regularly over telephone networks in two-party calls or multi-party conference calls. There is an ever-present risk that such information can be recorded and then distributed to unauthorized parties.

One technique for identifying unauthorized distribution and audio information leaks is audio stream watermarking. In watermarking an unobtrusive code is added to audio content that can be used as an identification marker. While watermarking of telephone audio content has been disclosed, for example, in U.S. Pat. No. 8,121,264, watermarking solutions have not been applied, generally to identify the source of leakage of audio recordings.

It would therefore be advantageous to provide a method of identifying the source of an audio leak in a telephone communication network that is applicable to all telephony traffic include 2-way and multiparty communications.

SUMMARY OF THE INVENTION

Embodiments of the present invention provide a method of preventing information leaks in telephony communications involving any number of parties in an IP telephony network having core components. The method comprises receiving an outbound audio and signaling stream from a first terminal device within the IP telephony network, determining call parameters of the outbound audio stream, storing the call parameters within the IP telephony network, and inserting a watermark into the outbound audio stream, routed from the IP telephony core components to the second terminal device, with an audio watermark using the determined call parameters within the IP telephony network, wherein the watermarked outbound audio stream can be used to identify unauthorized recordings of the outbound audio stream recorded at the second terminal device at which the watermarked outbound stream is received.

In certain embodiments, the IP telephony network includes a core IMS network having one or more proxy servers, a plurality of session border controllers and a plurality of local access networks having one or more proxy servers, each of the plurality of local access networks coupled to the IMS network via one of the plurality of session border controllers.

In certain embodiments, the watermark is inserted by a proxy server in a local access network to which the first terminal device is coupled. In other embodiment, the watermark is inserted by a session border controller coupling the local access network to which the second terminal device is coupled and the core IMS network. In still other embodiments, the watermark is inserted by a proxy server in the core IMS network.

Embodiments of the method further include the step of identifying a source of a recording of the watermarked audio stream made at a based on the watermark. The authenticity of a recording of the watermarked audio stream based on the watermark can also be verified.

Several watermarking techniques can be employed in the context of the present invention, including spread spectrum, amplitude modification, echo hiding, dithering and time-scale modification techniques.

These and other aspects, features, and advantages can be appreciated from the following description of certain embodiments of the invention and the accompanying drawing figures and claims.

DETAILED DESCRIPTION CERTAIN OF EMBODIMENTS OF THE INVENTION

Disclosed herein are methods for embedding a watermark into an outbound telephone communication (call) audio stream in order to identify the source of the audio stream and any potential information leak thereof. The outbound audio stream can be recorded at and distributed from the receiving terminal device, so that the receiving device can be a potential source of an information leak. The watermark can be inserted into standard 2-party calls as well as conference calls and can identify the source of a recording of the watermarked audio. The watermarked audio can also be used to validate the authenticity of a recording of a call. The watermark can be implemented as a noise-tolerant sound wave that is inserted into the audio stream and is unique for each audio stream. Watermark parameters are stored within the telephony system together with the call information and the audio stream receiving party information, which helps to identify the call and any possible leaks. An embedded watermark can be detected and the watermark parameters can be decoded by waveform analysis tools. The parameters can be matched with the records in the telephony system to identify a specific telephone call, including the device at which the audio has been recorded. Embodiments of the present invention can be used for copyright or ownership identification of a recording, protection of corporate confidential information and intellectual property, and for validating the authenticity of the phone call recording.

It is noted that the terms "embedding" and "inserting" with respect to a watermark are intended to have the same meaning and are used interchangeably herein.

Figure 1:
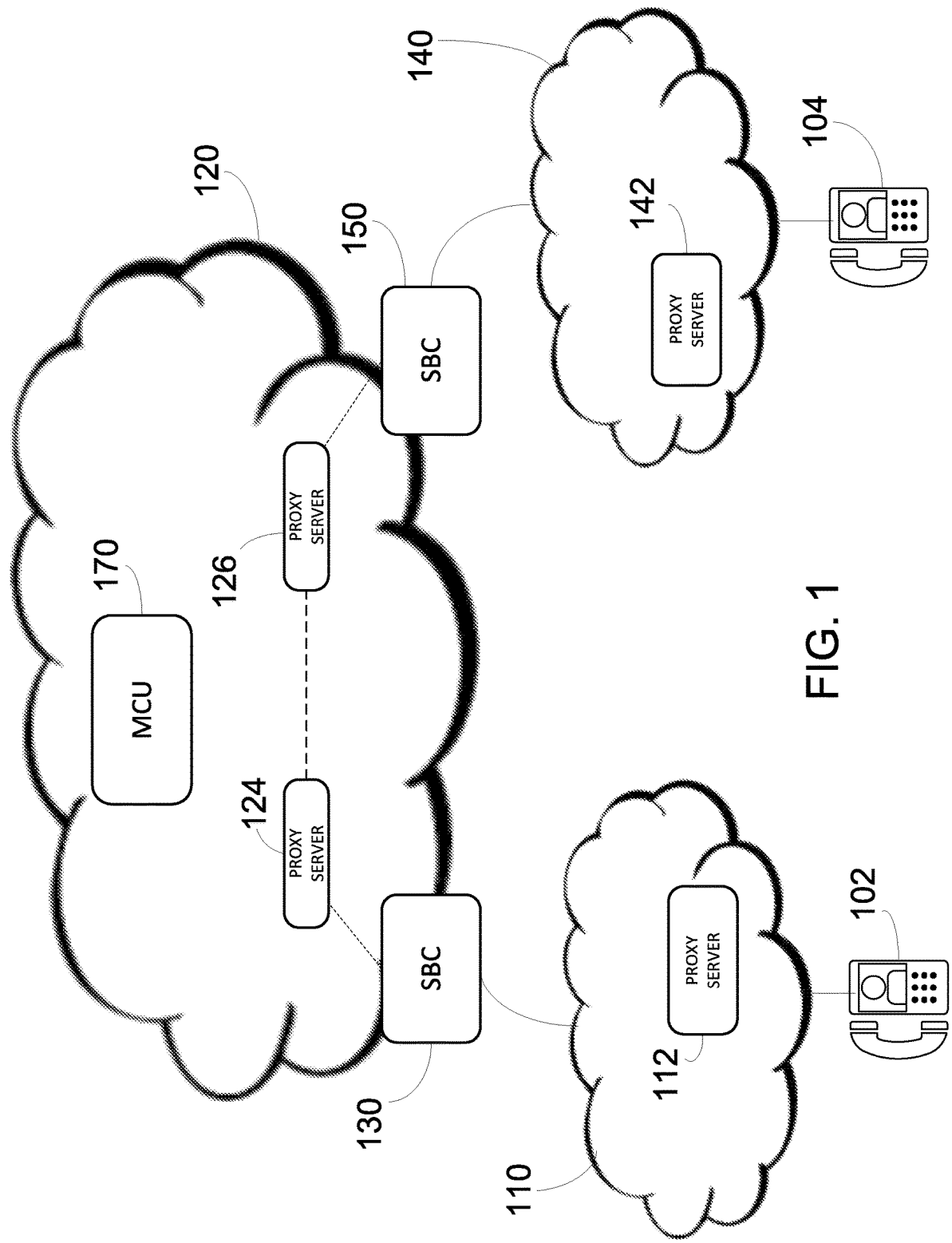
FIG. 1 is a schematic block diagram showing an IP (Internet Protocol) telephony system in which embodiments of the present invention can be employed.

FIG. 1 is a schematic block diagram showing an IP (Internet Protocol) telephony system 100 in which embodiments of the present invention can be employed. At a first edge of the system is a first terminal device 102 enabled for IP telephony communication. The first terminal device can be a digital telephone, mobile device such as a smart phone, an analog telephone coupled to a digital adapter, or in general, any computing device that includes components for receiving audio input (e.g., a microphone), generating audio output (e.g., one or more speakers), and communication using TCP/IP protocol (e.g., transceivers, antennas, ports). The first terminal device 102 is directly communicatively coupled to a first access network 110, which can be a local enterprise network operable to communicate using TCP/IP protocol. The first terminal device 102 generates signals based on user audio input which are then transmitted on an outbound path to the first access network 110.

Within the first access network 110 is a first proxy server 112 that receives and processes outbound communication requests from terminal devices such as first terminal device 102 that are coupled to the first access network. The proxy server 112 also receives inbound communications targeted to the first terminal device 102 from outside the first access network and is adapted to deliver the targeted communications to the first terminal device 102. The first access network 110 is in turn communicatively coupled to an IP multimedia core network (IMS) 120 via a first session border controller 130 (SBC). The IMS 120 provides IP telephony connectivity among a plurality of access networks. For example, in the system 100 shown, the IMS 120 which is intermediary between the first access network 110 and a second access network 140. The first session border controller 130 establishes, configures maintains, and closes telephony sessions between the first access network 110 and the IMS 120. In operation, the session border controller 122 controls signaling and can also control the audio and other media streams that are transmitted between the first access network 110 and the IMS 120. The IMS network 120 can include a plurality of proxy servers e.g., 124, 126 that are configured to direct (and optionally modify) communications toward target addresses. A second session border controller 150 is positioned between the IMS 120 and the second access network 140 and performs similar functions to the first session border controller 130, establishing, configuring maintaining and closing communications between the second access network 140 and the IMS 120. The second access network 140 includes a second proxy server 142 that is coupled to the second terminal device 104. Although only one terminal device (e.g., 102, 104) is depicted at each edge of the system, it is to be understood that these devices are merely representative and that a larger number of devices can be connected, for example, in a conference call session. In some embodiments, the IP telephony system can also include a multipoint control unit 170, as shown in FIG. 1. The multi-point control unit is operative to bridge connections to allow multipoint conferencing.

According to the present invention, in different embodiments, components in one or more of the access networks, IMS or the session border controllers can be used to embed watermarks the audio stream of outbound communications. The session border controllers and proxy servers are computing devices having one more processing units (e.g., one or more microprocessors, digital signal processors (DSPs) and/or application-specific processing units) and memory devices (e.g., cache memory, main memory, flash memory or additional memory devices). In different embodiments, these devices can be programmed with executable instructions for implementing a watermarking application (module).

Figure 2:
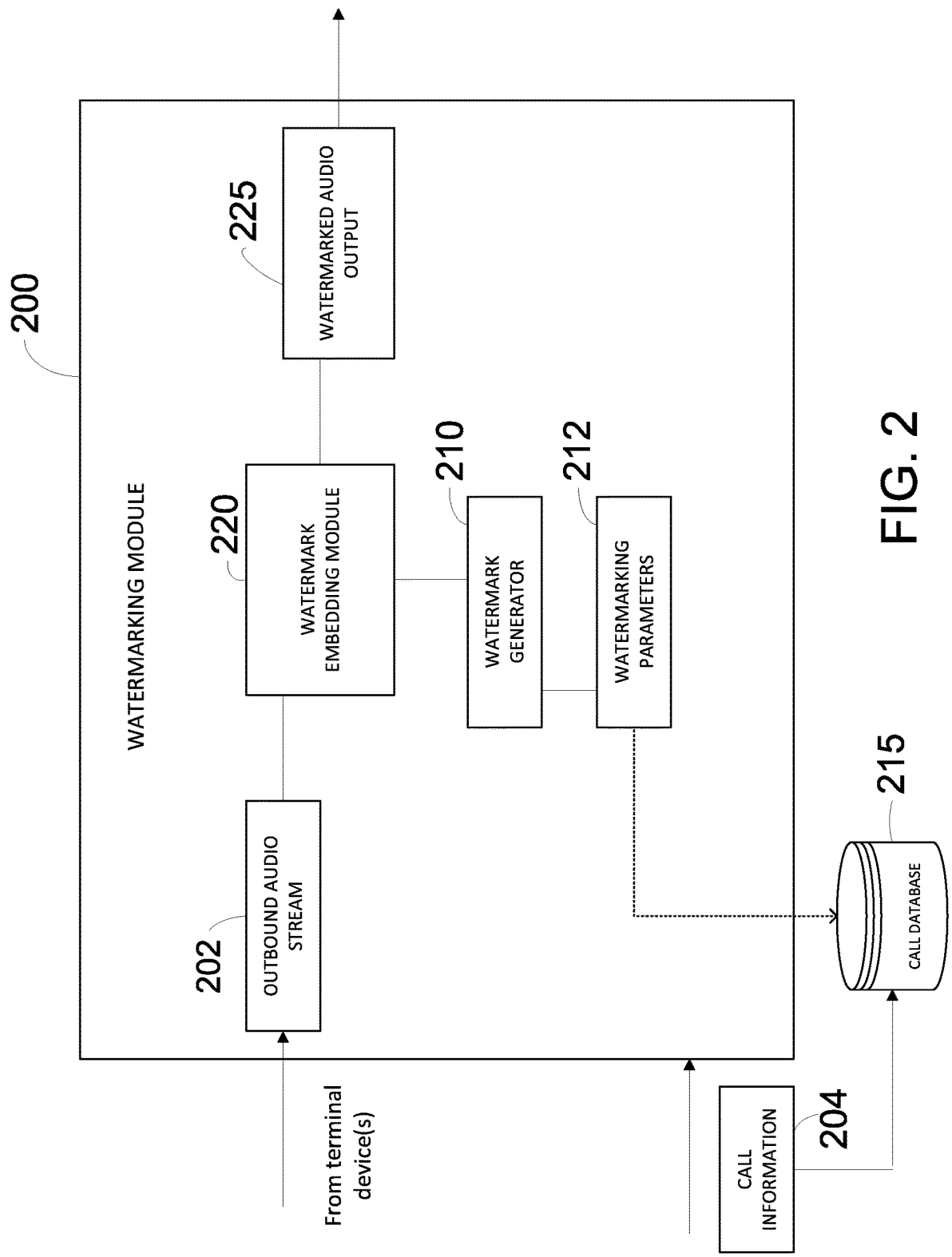
FIG. 2 is a schematic illustration of a watermarking module according to an exemplary embodiment of the present invention

FIG. 2 is a schematic illustration of a watermarking module 200 according to an embodiment of the present invention. The module receives as input an audio stream that is outbound from the telephony system 202, such as the audio stream routed from the inbound SBC and/or a multipoint control unit (MCU) toward the second terminal device. A watermarking generator 210 creates a watermark based on watermark parameters 212 that are unique to the outbound audio stream. The watermarking parameters 212 are saved in a call database 215. Call information 204 that accompanies the audio stream (for example, in a signaling stream) is saved in the call database 215 in association with the watermarking parameters 215. The watermark output from the watermark generator 210 and the outbound audio stream of a particular session are input to a watermark embedding module 220 which embeds the watermark into the outbound audio stream using an audio watermarking technique. The watermarked outbound audio stream forms the output 225 of the watermarking module.

Several different techniques can be used to generate an audio watermark including spread-spectrum, amplitude modification, echo hiding, dithering and time-scale modification. In spread spectrum techniques a narrow-band watermark sequence is embedded into a wide-band channel of an audio signal. This technique is well-known from telecommunications technology, such as code-division multiplexing (CDMA). In amplitude modification, a sequence carrying the watermark is used as a substitute for lower order bits of a digital audio signal. The echo hiding technique involves embedding data into an original audio signal by introducing an echo in the time domain. Messages are embedded by echoing the original signal with one of two binary delays (i.e., 0,1). In the dithering technique, a noise signal is added to the input audio signal with a known probability distribution, such as Gaussian or triangular. The watermark is used to modulate the dither signal. Time-scale modification involves compressing or expanding the time-scale of an audio signal, for example, by changing the time-scale between the maxima and minima of an audio signal. Each of the techniques has different characteristics in terms of robustness, security and computational complexity. A given watermark embedding module can be configured to be able to implement a plurality of the techniques and a suitable technique can be user-selected based on the watermarking criteria.

Figure 3:
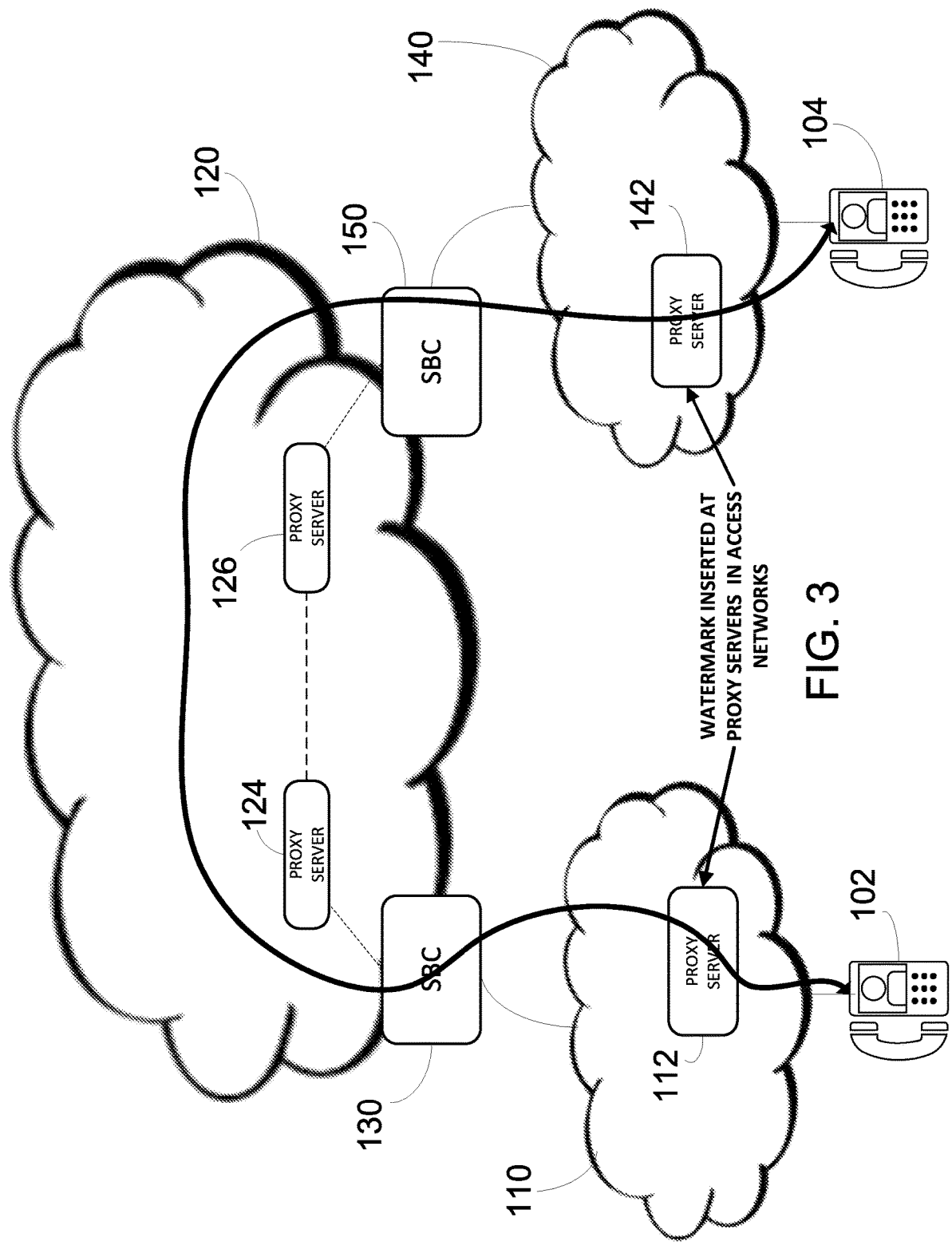
FIG. 3 is a schematic view of an IP telephony system illustrating an embodiment of a method of embedding watermarks in outbound audio streams according to the present invention.

FIG. 3 shows a schematic view of an IP telephony system illustrating an embodiment of a method of embedding watermarks in outbound audio streams according to the present invention. As shown, the flow of the telephony session is end-to-end from terminal device 102 to terminal device 104. Outbound communication from the first terminal device 102 flows through the first proxy server 112, first session border controller 130, then through the IMS 120 to the second session border controller 150, and the second proxy server 142 to the second terminal device 104. On this first outbound path, a watermark is inserted by the second proxy server 142 so that the second terminal device 104 receives a watermarked audio stream. Similarly, outbound communication from the second terminal device 104 flows through the second proxy server 142, second session border controller 150, then through the IMS to the first session border controller 130 and the first proxy server 112 to the first terminal device 102. On this second outbound path, a watermark is inserted by the first proxy server 112 so that the first terminal device 102 receives a watermarked audio stream.

Figure 4:
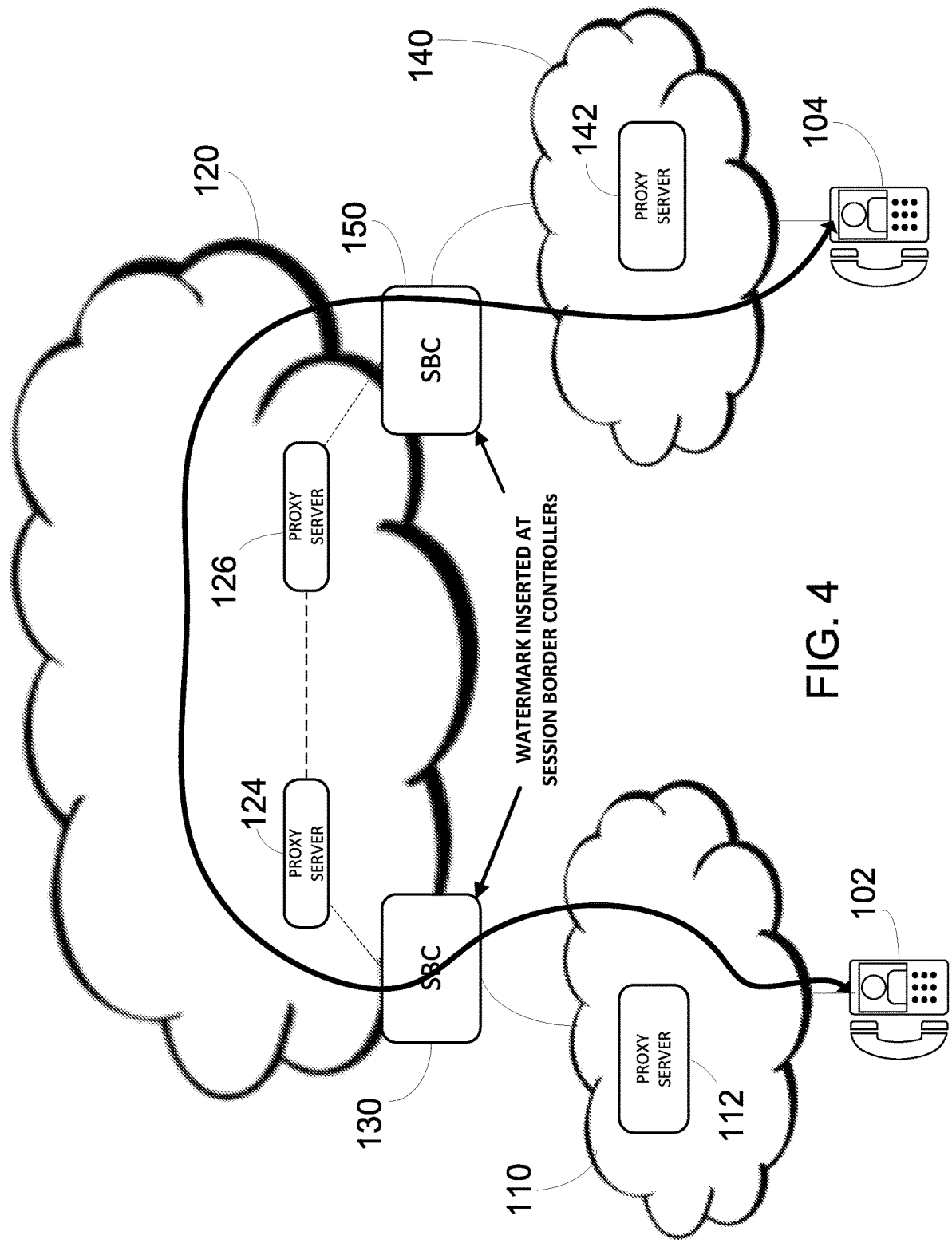
FIG. 4 is a schematic view of an IP telephony system illustrating another embodiment of a method of embedding watermarks in outbound audio streams according to the present invention.

FIG. 4 shows a schematic view of an IP telephony system illustrating another embodiment of a method of embedding watermarks in outbound audio streams according to the present invention. As shown, the flow of the telephony session is end-to-end from terminal device 102 to terminal device 104. Outbound communication generated by the first terminal device 102 flows through the first session border controller 130, then through the IMS 120 to the second session border controller 150, and then to the second terminal device 104. On this first outbound path, a watermark is inserted by the second session border controller 150 so that the second terminal device 104 receives a watermarked audio stream. Similarly, outbound communication generated by the second terminal device 104 flows through second session border controller 150, then through the IMS to the first session border controller 130 and then to the first terminal device 102. On this second outbound path, a watermark is inserted by the first session border controller so that the first terminal device 102 receives a watermarked audio stream.

Figure 5:
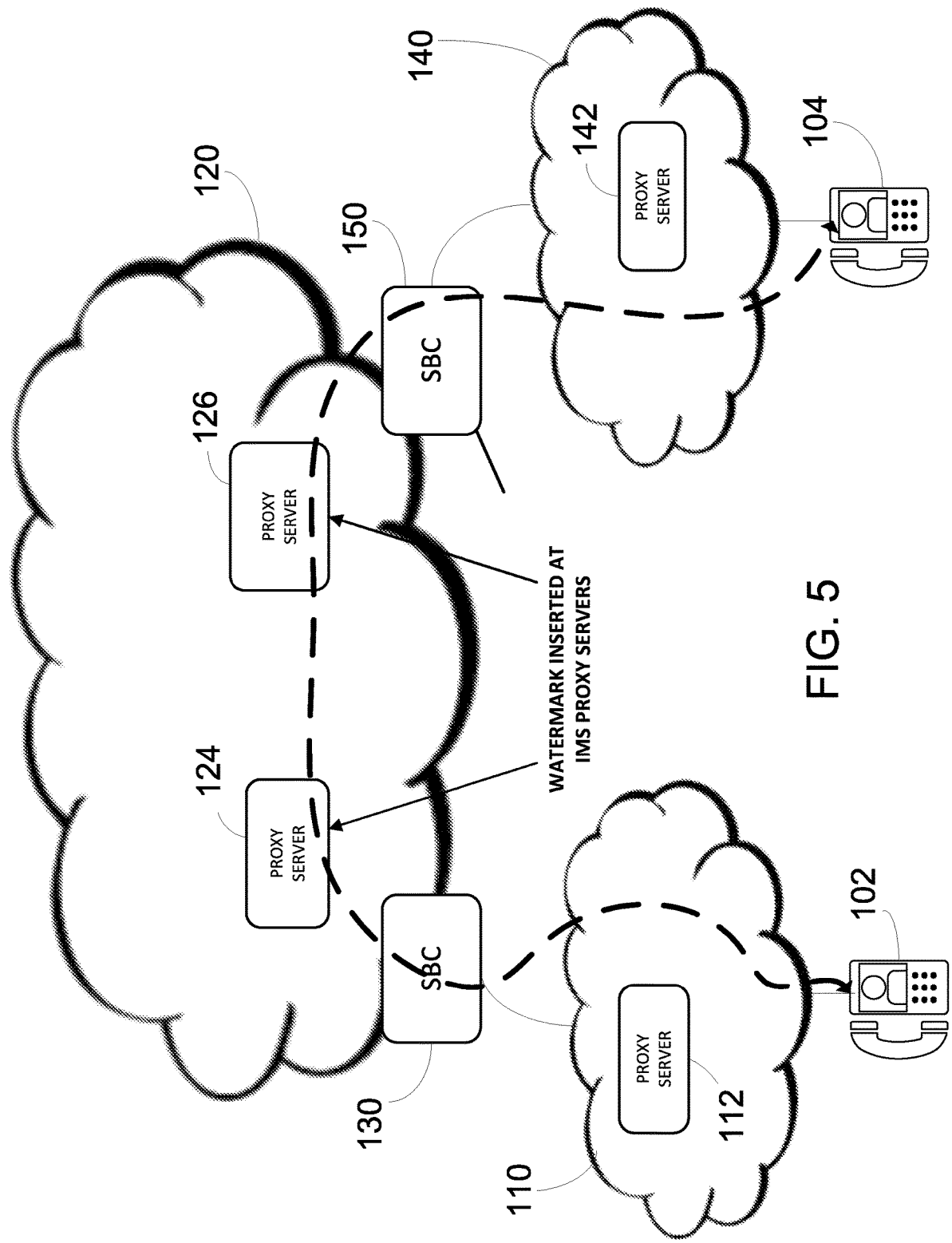
FIG. 5 is a schematic view of an IP telephony system illustrating another embodiment of a method of embedding watermarks in outbound audio streams according to the present invention.

FIG. 5 shows a schematic view of an IP telephony system illustrating yet another embodiment of a method of embedding watermarks in outbound audio streams according to the present invention. As shown, the flow of the telephony session is end-to-end from terminal device 102 to terminal device 104. Outbound communication generated by the first terminal device 102 flows through the first session border controller 130, then to the first IMS proxy server 124 to which the session border controller diverts VoIP traffic. The watermark is inserted into the outbound audio stream at the first IMS proxy server 124, delivered to the second session border controller 150, and then transmitted from the second session border controller to the second terminal device 104. Outbound communication generated by the second terminal device 104 flows through second session border controller 150 to a second IMS proxy server 126 which inserts the watermark in the audio stream. The watermarked audio stream is delivered to the first session border controller 130 and is then transmitted from the first session border controller 130 to the first terminal device 102.

Figure 6:
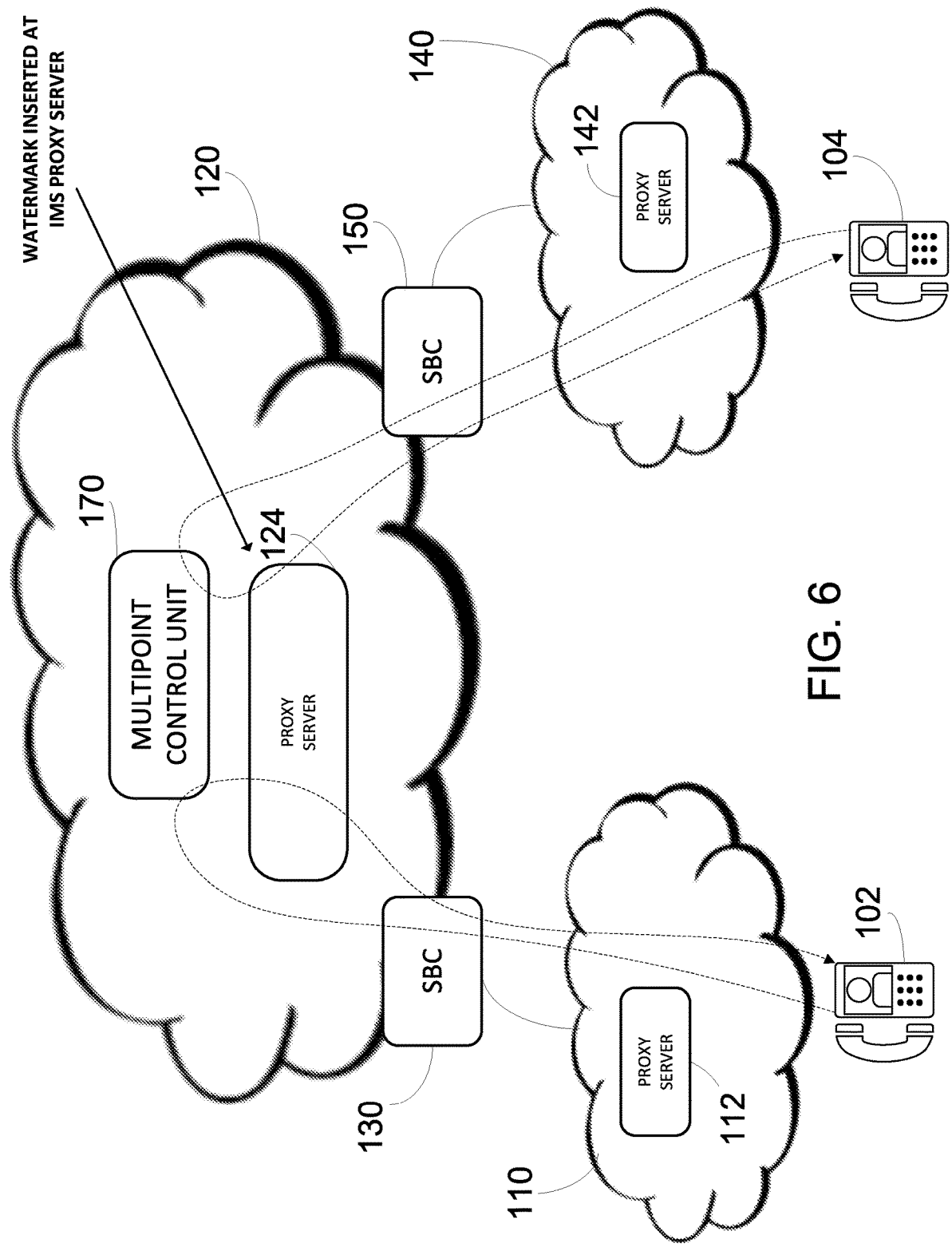
FIG. 6 is a schematic view of an IP telephony system illustrating another embodiment of a method of embedding watermarks in outbound audio streams according to the present invention.

FIG. 6 shows a schematic view of an IP telephony system illustrating an embodiment of a method of embedding watermarks in outbound audio streams in a conference according to the present invention. As shown, the flow of the telephony session is not end-to-end from terminal device 102 to terminal device 104, but rather is mediated by a multipoint controller unit 170. Outbound communication generated by the first terminal device 102 flows through the first session border controller 130, and then is directed to the multipoint controller unit 170. Concurrently, outbound communication generated by the second terminal device 104 flows through the second session border controller 150, and also is directed to the multipoint controller unit. At the multipoint controller unit 170, the outbound audio streams from the first and second terminal devices 102, 104 are mixed. The mixed audio stream is directed to an IMS proxy server 124, at which a watermark is inserted into the mixed audio stream. The watermarked audio stream is directed from the IMS proxy to both the first and second session border controllers 130, 150, from where the audio stream is directed to the respective terminal devices 102, 104.

Figure 7:
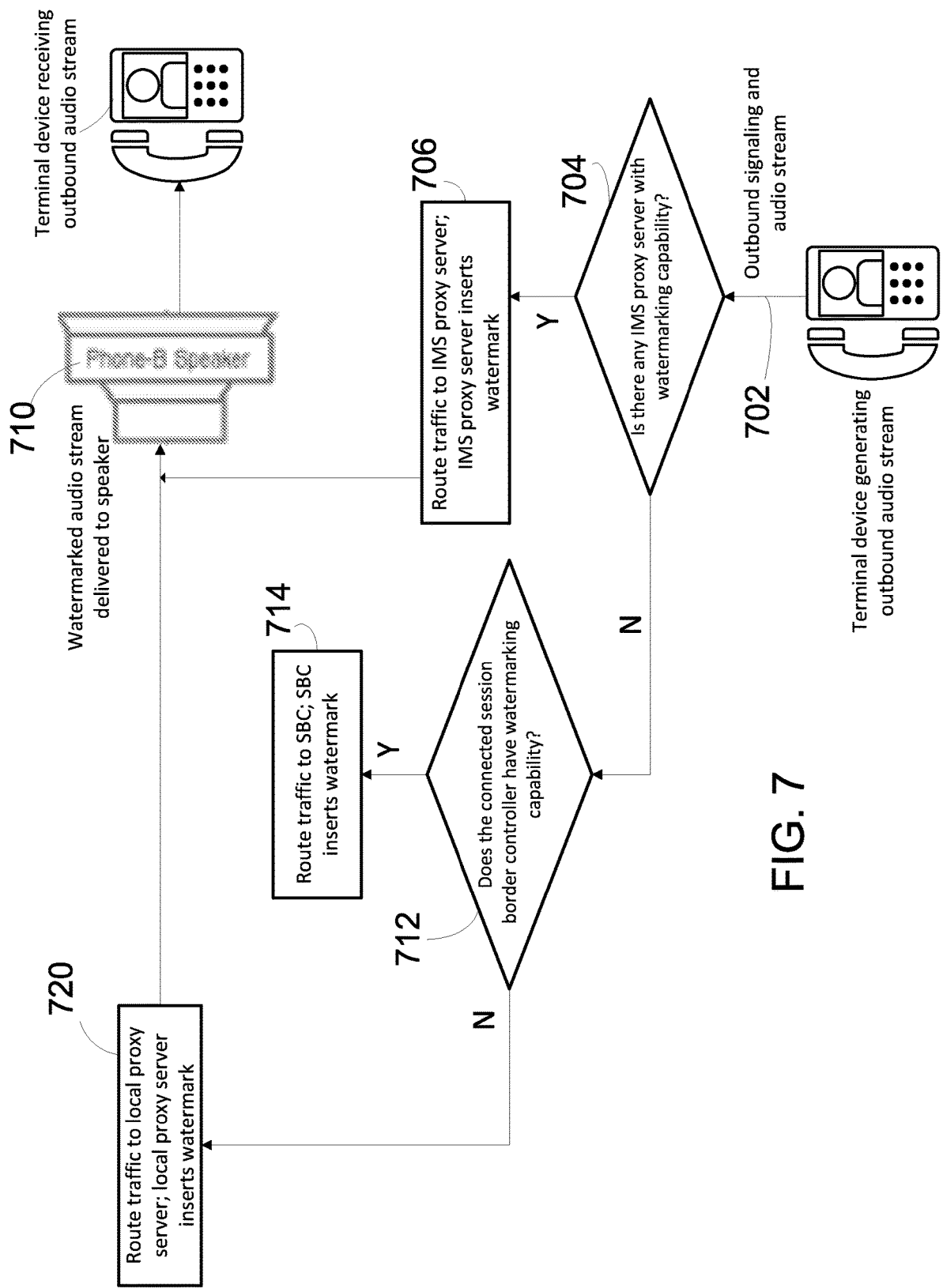
FIG. 7 is a flow chart of an embodiment method for selecting a component of an IP telephony network to insert a watermark in an outbound audio and signaling stream according to the present invention.

FIG. 7 is a flow chart of a method of watermarking an outbound audio stream in an IP telephony network according to the present invention. In a first step of the method 702, an outbound audio and signaling stream is transmitted from a terminal device (e.g., 102). In step 704, it is determined (within the IMS network) whether an IMS proxy server having watermarking capability is available. If so, the watermark is inserted into the outbound audio stream by the IMS proxy server in step 706. The watermarked audio stream is output to a speaker of a destination terminal device (e.g., 104) in step 710. If in step 704 it is determined that there is no IMS proxy server having watermarking capability, then in step 712, it is determined whether the session border controller to which the local access network of the terminal device is coupled has watermarking capability. If so, then in step 714, the session border controller inserts a watermark into the outbound stream, and the watermarked audio stream is output to the speaker of terminal device 104 similarly. If it is determined in step 712 that the session border controller does not have watermarking capability, the method proceeds to step 720, in which a watermark is inserted by a proxy server on the local access network of the originating terminal device.

The flow chart of FIG. 7 implements a particular order for selecting the network component that embeds the watermark into the outbound audio stream. In other implementations, the order of selection can be different. For example, the session border controller can be selected first before determining whether an IMS proxy server has watermarking capability.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for preventing information leaks in telephony communications directed from a caller terminal to a callee terminal, both the caller terminal and callee terminal being located in local networks coupled to an IP telephony network having a plurality of components, comprising:

receiving, within the IP telephony network, an outbound audio and signaling stream from the caller terminal within the IP telephony network;

determining watermark call parameters of the outbound audio stream;

storing the watermark call parameters as telephone network records in a call database within the IP telephony network;

inserting an audio watermark into the outbound audio stream using the determined watermark call parameters at a component of the IP telephony network or within a local network in which the callee terminal is located;

routing the outbound audio stream to the callee terminal;

producing the watermarked outbound audio stream at the callee terminal;

decoding the watermark call parameters from the watermarked outbound audio stream by a waveform analysis tool;

matching the decoded watermark call parameters with the telephone network records in the call database; and identifying, from the matched watermark call parameters, unauthorized recordings of the outbound audio stream recorded at the callee terminal at which the watermarked outbound stream is received.

2. The method of claim 1, wherein the IP telephony network includes a core IMS network having one or more proxy servers, a plurality of session border controllers and a plurality of local access networks having one or more proxy servers, each of the plurality of local access networks being coupled to the IMS network via one of the plurality of session border controllers.

3. The method of claim 2, wherein the watermark is inserted by a proxy server in a local access network to which the second terminal device is coupled.

4. The method of claim 3, wherein the watermark is inserted by a session border controller coupling the local access network to which the first terminal device is coupled and the core IMS network.

5. The method of claim 2, wherein the watermark is inserted by a proxy server in the core IMS network.

6. The method of claim 1, further comprising identifying a source of a recording of the watermarked audio stream based on the watermark.

7. The method of claim 1, further comprising verifying authenticity of a recording of the watermarked audio stream based on the watermark.

8. The method of claim 1, wherein the watermark is inserted using a spread spectrum technique.

9. The method of claim 1, wherein the watermark is inserted using an amplitude modification technique.

10. The method of claim 1, wherein the watermark is inserted using an echo hiding technique.

11. The method of claim 1, wherein the watermark is inserted using a dithering technique.

12. The method of claim 1, wherein the watermark is inserted using a time-scale modification technique.

13. The method of claim 1, wherein the IP telephony network includes an IP multimedia core network.

14. The method of claim 13, wherein the IP multimedia core network includes the call database.

15. The method of claim 13, wherein the IP multimedia core network stores the watermark call parameters as the telephone network records.

16. The method of claim 13, wherein the IP multimedia core network inserts the audio watermark into the outbound audio stream using the determined watermark call parameters.

17. The method of claim 13, wherein the IP multimedia core network includes a proxy server which inserts the audio watermark into the outbound audio stream using the determined watermark call parameters.

* * * * *